(12) United States Patent
Ishizuka

(10) Patent No.: US 7,419,217 B2
(45) Date of Patent: Sep. 2, 2008

(54) RECLINING DEVICE OF TWO-POINT HINGED TYPE FOR SEAT

(75) Inventor: Takanori Ishizuka, Akishima (JP)

(73) Assignee: Tachi-S Co. Ltd., Tokyo (JP)

( * ) Notice: Subject to any disclaimer, the term of this patent is extended or adjusted under 35 U.S.C. 154(b) by 416 days.

(21) Appl. No.: 11/330,355

(22) Filed: Jan. 12, 2006

(65) Prior Publication Data

US 2007/0158989 A1 Jul. 12, 2007

(51) Int. Cl.
*B60N 2/48* (2006.01)

(52) U.S. Cl. .............................. 297/378.12; 297/378.1; 297/378.14; 297/367

(58) Field of Classification Search ............ 297/378.12, 297/378.14, 378.1, 367
See application file for complete search history.

(56) References Cited

U.S. PATENT DOCUMENTS

| | | | | |
|---|---|---|---|---|
| 4,484,779 A | * | 11/1984 | Suzuki | 297/326 |
| 5,997,090 A | * | 12/1999 | Baloche et al. | 297/367 |
| 6,139,104 A | * | 10/2000 | Brewer | 297/353 |
| 6,402,250 B1 | * | 6/2002 | Lange | 297/378.12 |
| 6,464,299 B1 | * | 10/2002 | Castagna | 297/378.12 |
| 7,025,422 B2 | * | 4/2006 | Fast | 297/378.14 |
| 7,114,779 B2 | * | 10/2006 | Thiel et al. | 297/378.12 |

FOREIGN PATENT DOCUMENTS

| | | |
|---|---|---|
| JP | 09-286264 | 11/1997 |
| JP | 11-075980 | 3/1999 |

\* cited by examiner

*Primary Examiner*—Laurie K Cranmer
(74) *Attorney, Agent, or Firm*—Browdy and Neimark

(57) ABSTRACT

A reclining device of two-point hinged type including a reclining plate element having one end connected via first lock mechanism with lower hinge point about which the reclining plate element is inclined and another end connected via second lock mechanism with upper hinge point about which a seat back is foldable forwardly. A forward inclination limit point is defined to limit forward rotation of the reclining plate element. Bifurcated flexible wire cable is arranged between unlocking plate and the first and second lock mechanisms, such that operation of the unlocking plate causes synchronized unlocking operation of both first and second lock mechanisms, whereupon the reclining plate element is automatically rotated to the forward inclination limit point, thereby allowing the seat back to be foldable relative to the upper hinge point in the thus-inclined reclining plate element down to a non-use position, with the backward side thereof extending along a substantially horizontal line.

5 Claims, 6 Drawing Sheets

RECLINING DEVICE OF TWO-POINT HINGED TYPE FOR SEAT

BACKGROUND OF THE INVENTION

1. Field of the Invention

The present invention relates to a reclining device of two-point hinged type for use in a vehicle seat, which has a reclining hinge, a center of rotation about which a seat back of the seat is rotatively and adjustably inclined to a desired angle and a folding hinge, a center of rotation about which the seat back is rotatively folded.

2. Description of Prior Art

A two-point hinged structure has been employed in a vehicle seat to provide a lower hinge point about which a seat back is rotatively reclined and an upper hinged point about which the seat back is folded down to or unfolded from a seat cushion. As typically known from the two Japanese Laid-Open Patent Publications Nos. 9-286264 and 11-75980 for instance, this kind of two-point-hinged reclining device is effective in allowing the seat back to be folded down to a substantially horizontal line with respect to the seat cushion, while maintaining its original reclining functions.

Specifically, reference is made to FIG. 8 which shows an elevational side view which roughly shows a structure of the above-stated conventional two-point hinged type of reclining device (110) provided in a vehicle seat. According thereto, a reclining plate element (112) is at the lower end portion thereof pivotally connected via a lower hinge pin (118) with the backward end portion of a base frame member (116) in a seat cushion (114), and is at the upper end portion thereof pivotally connected via an upper hinge pin (122) with the lower end portion of a seat back frame member (121) in a seat back (120). Hence, the seat back (120) may be adjustably inclined about the lower hinged point (at 118) in forward and backward directions, and further be folded about the upper hinged point (at 122) from a substantially vertical use position indicated by one-dot chain line down to a slightly sloped non-use position indicated by the two-dot chain line.

Designation (124) denotes a reclining lock mechanism for locking the seat back (120) to a desired inclined angle and releasing the seat back therefrom. Designation (126) denotes a folding lock mechanism for locking the seat back (120) to the non-use position and releasing the seat back from that non-use position.

In this sort of reclining device, as described in the foregoing Japanese Laid-Open Patent Publication No. 9-286264, there is normally provided a lock mechanism or stopper means for limiting the forward inclination of seat back at a predetermined angle relative to the reclining plate (at 112) in light of safety reasons. That is, referring again to FIG. 8, normally, unless the reclining plate (112) is inclined by a particular angle, a user has to unlock the seat back (120) via the folding lock mechanism (126) and incline it forwardly. But, as indicated by the two-dot chain lines in the FIG. 8, the forward inclination of the seat back (120) relative to the upper hinge point (at 122) is prevented by the foregoing safety lock or stopper means (not shown) so that the seat back (120) is only inclined to the upwardly sloped state as shown, with the result that the seat back (120) can not be folded down onto the seat cushion (114) and therefore the back surface (120a) thereof is not positioned on a substantially horizontal line. In that case, in addition to the afore-said folding lock operation, it is further required for the user to operate the reclining lock mechanism (124) to unlock the seat back (120) from the current reclining locked state and incline it forwardly to a substantially horizontal line. This apparently results in troublesome intricate operations being required on the user's side.

Incidentally, there has been known a dual lock mechanism, (as disclosed by the Japanese Laid-Open Patent Publication No. 2003-319847 for instance), which is normally provided in a pair of ordinary reclining devices (the so-called dual reclining device) of one-point hinged type wherein each of the two reclining device has an arm which is pivotally connected via one hinge pin with the corresponding one of two side frame members of seat cushion frame, the arm having upper end connected with a seat back frame. This dual lock mechanism includes a pair of lock elements which are operatively provided in the respective two ordinary reclining devices so as to be operable in a synchronized manner for locking and unlocking both of the two reclining devices. As suggested in the above-noted Japanese Laid-Open Patent Publication No. 11-75980, it is preferable to provide such dual reclining lock mechanism to the two-hinge point type of reclining device stated above. But, as this sort of reclining device has been with the above-described problems, it is technically difficult to incorporate the dual reclining lock mechanism therein.

SUMMARY OF THE INVENTION

In view of the above-stated drawbacks, it is a purpose of the present invention to provide an improved reclining device of two-point hinged type for seat which can easily be unlocked by one operation so that the seat back is folded to a non-use position, with the backward side thereof extending along a substantially horizontal line.

In order to achieve such purpose, in accordance with the present invention, there is basically provided a reclining device of two-point hinged type in combination with a seat having a seat cushion and a seat back, which has: a lower hinge point about which the seat back is inclinable in a direction forwardly and backwardly of the seat, the lower hinge point being defined at a seat cushion frame provided in the seat cushion; and an upper hinge point about which the seat back is foldable forwardly of the seat in a direction from a use position where the seat back extends vertically from the seat cushion down to a non-use position where the seat back is positioned adjacent to the seat cushion, wherein the upper hinge point is defined above the lower hinge point, and wherein the seat back has a backward side which faces to a side backwardly of the seat when the seat back is set at the use position, the reclining device of two-point hinge type comprising:

a reclining plate element having one end disposed at the lower hinge point and another end disposed at the upper hinge point, the reclining plate element being rotatable relative to the lower hinge point in the direction forwardly and backwardly of the seat, wherein a maximum forward inclination point is defined to limit rotation of the reclining plate element in the direction forwardly of the seat relative to the seat cushion, a biasing means for biasingly causing the reclining plate element to rotate relative to the lower hinge point in a direction forwardly of the seat;

a first lock mechanism for locking and unlocking the reclining plate element, the first lock mechanism being fixedly provided to the seat cushion frame and having a shaft disposed at a point corresponding to the lower hinge point, the shaft being fixed to the one end of the reclining plate element, with such an arrangement that rotation of the shaft in one direction causes unlocking operation of the first lock mechanism so as to unlock the reclining plate element, thereby allowing inclination of the seat back relative to the lower hinge point in a direction forwardly and backwardly of the seat, whereas by contrast, rotation of the shaft in another direction opposite to the afore-said one direction causes locking operation of the first lock mechanism so as to lock the reclining plate element against the inclination;

a second lock mechanism for locking and unlocking the seat back, the second lock mechanism having a shaft corresponding to the upper hinge point, wherein the shaft is fixed to the afore-said another end of the reclining plate element, with such an arrangement that rotation of the shaft in one direction causes unlocking operation of the second lock mechanism to unlock the seat back with respect to the reclining plate element, thereby allowing for folding of the seat-back relative to the upper hinge point in a direction forwardly and backwardly of the seat, whereas by contrast, rotation of the shaft in another direction opposite to the one direction causes locking operation of the second lock mechanism so as to lock the seat back against the folding of the seat back;

one unlocking lever operatively provided in a predetermined position;

a flexible wire cable means comprising a flexible sheath means and a wire means slidably extending in and along the flexible sheath member, wherein the shaft of the first lock mechanism and the shaft of the second lock mechanism are operatively connected with the afore-said one unlocking lever via the wire means of the flexible wire cable means, wherein the maximum forward inclination point is preset in order for the seat back to be foldable forwardly of the seat, relative to the upper hinge point in the reclining plate element which has been inclined to the maximum forward inclination point, such that, after having inclined the seat back to the maximum forward inclination point relative to the lower hinge point, the seat back is foldable down to the seat cushion relative to the upper hinge point, with the backward side thereof extending along a substantially horizontal line, and wherein, upon operation of the one unlocking lever, the wire means is slidingly moved through the flexible sheath means, thereby directly causing both the shafts respectively of the first and second lock mechanisms to rotate simultaneously in the afore-said one direction and thus causing the unlocking operation of both the first and second lock mechanism in synchronized manner, so that the reclining plate element is automatically inclined by the biasing means relative to the lower hinge point to the maximum forward inclination point, after which, the seat back is foldable relative to the upper hinge point in the thus-inclined reclining plate element down to a predetermined non-use position where the backward side of the seat back extends along the substantially horizontal line.

Preferably, the flexible wire cable means may comprise a flexible bifurcated wire cable which essentially consists of: a single flexible wire cable portion; and a bifurcated flexible wire cable portion extending continuous with the single flexible wire cable portion. The single flexible wire cable portion may be connected with the unlocking lever, while the bifurcated flexible wire cable portion be connected with the shafts respectively of the first and second lock mechanisms.

Other various features and advantages of the present invention will become apparent from reading of the description, with reference to the annexed drawings.

DETAILED DESCRIPTION OF PREFERRED EMBODIMENT OF THE INVENTION

Referring to FIGS. 1 through 7, there is illustrated a preferred embodiment of a reclining device of two-point hinged type, as generally designated by (10), which is provided in a vehicle seat (11) of foldable type (or fold-down type of vehicle seat), in accordance with the present invention.

Figure 1:
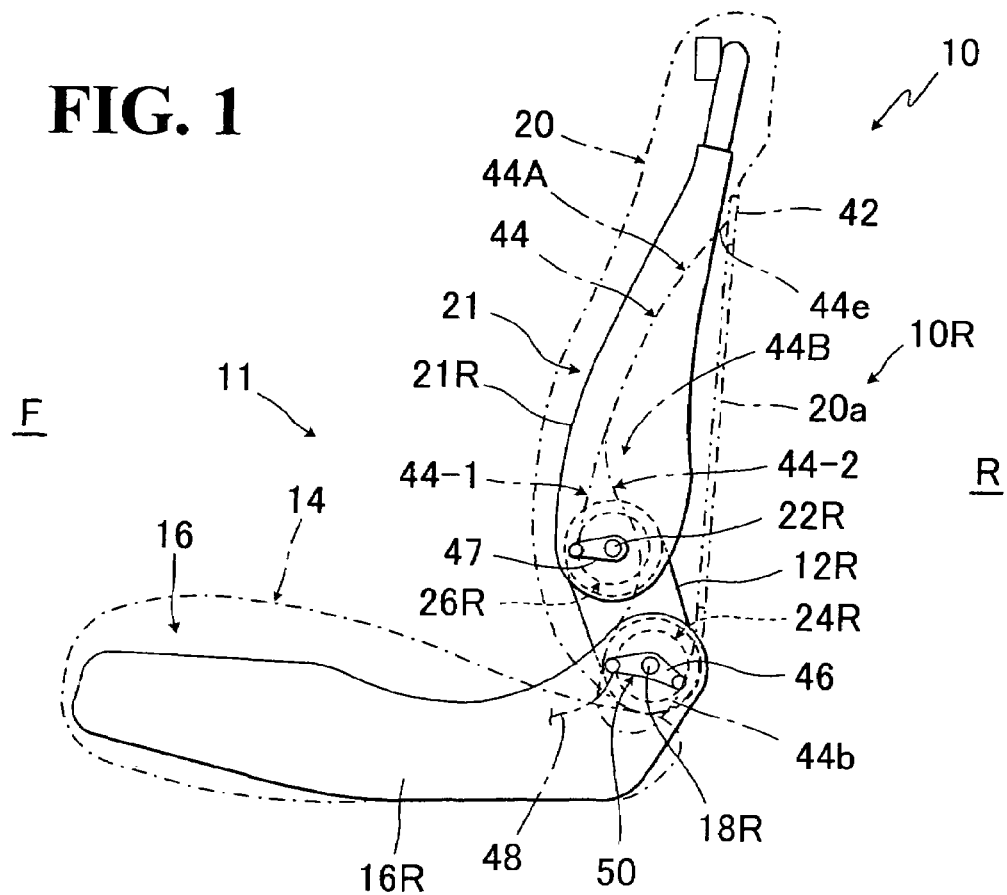
FIG. 1 is a schematic elevational side view showing a reclining device of two-point hinged type providing in a seat in accordance with the present invention.
Figure 6:
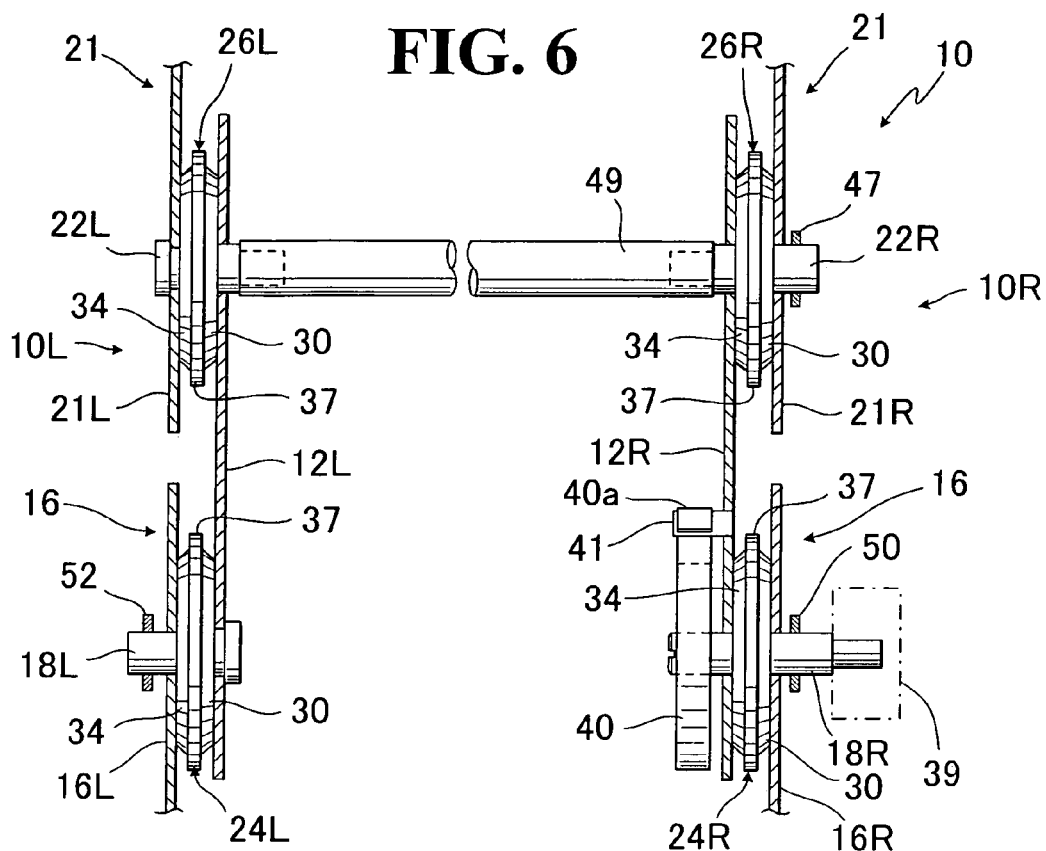
FIG. 6 is a sectional view showing the principal parts on both one and another sides as applied to a dual reclining device structure.

As can be seen from FIGS. 1 and 6, the vehicle seat (11) of this sort basically comprises a seat cushion (14) and a seat back (20) foldable onto the seat cushion (14). The seat cushion (14) includes a seat cushion frame (16) having a pair of right and left lateral frame members (16R) (16L) and a seat back frame (21) having a pair of right and left lateral frame members (21R) (21L).

Also, as can be seen from FIG. 6, the present two-point hinged type of reclining device (10) is of a dual reclining structure comprising a pair of right and left reclining mechanical elements (10R) (10L), each being, of course, of the above-described two-point hinged type. The right reclining mechanical element (10R) is operatively provided between the lower end of the right seat-back lateral frame member (21R) and the backward end portion of the right seat cushion frame (16R). Likewise, the left reclining mechanical element (10L) is operatively provided between the lower end of the left seat-back lateral frame member (21L) and the backward end portion of the right seat cushion frame (16L). As similar to the conventional reclining device of this kind, each of such right and left reclining devices (10R) (10L) has the following two different hinge points disposed vertically; namely, a lower hinge point (at 18R or 18L) and an upper hinge point (at 22R or 22L), and further has a reclining plate element (12R or 12L) operatively connected between those lower and upper hinge points.

Designations (24R) and (24L) denote right-side and left-side reclining lock mechanisms, respectively, which are operable for locking the seat back (20) to a desired inclined angle and unlocking the same (20) therefrom. Designation (26R) and (26L) denote right-side and left-side folding lock mechanisms, respectively, which are operable for locking the seat back (20) to the vertical non-use position shown in FIG. 1 and unlocking the seat back (20) from that non-use position, thereby allowing it to be foldable forwardly therefrom down to the seat cushion (14). It is noted hereinafter that the term, "forward" or "forwardly," refers to a forward side (F) of the seat (11), whereas the term, "backward" or "backwardly," refers to a backward side (R) of the seat (11).

The reclining plate element (12R or 12L) is at the lower end portion thereof (at 12R-2) pivotally connected via a lower hinge point (at 18R or 18L) with the backward end portion of a base frame member (16) in a seat cushion (14), and is at the upper end portion thereof pivotally connected via an upper hinge point (at 22R or 22L) with the lower end portion of a seat back frame member (21) in a seat back (20). Hence, the seat back (20) may be adjustably inclined by a desired angle relative to the lower hinge point (at 18R or 18L) in forward and backward directions, and further be folded relative to the upper hinge point (at 22R or 22L) from a substantially vertical use position indicated by one-dot chain line down to a generally horizontal non-use position indicated by the two-dot chain line.

In this regard, in accordance with the present invention, the afore-stated lower hinge point may be embodied by a bearing shaft (18R or 18L) of each of the right-side and left-side reclining lock mechanisms (24R) (24L), whereas the afore-stated upper hinge point be embodied by a bearing shaft (22R or 22L) of the right-side and left-side folding lock mechanisms (26R) (26L). In view of the locking nature of the reclining and folding lock mechanisms (24R, 24L, 26R and 26L), the bearing shaft itself (18R, 18L, 22R, or 22L) is not limited to such hinge point, but is also an operative shaft for causing locking and unlocking operation of each of those particular lock mechanisms.

Figure 7:
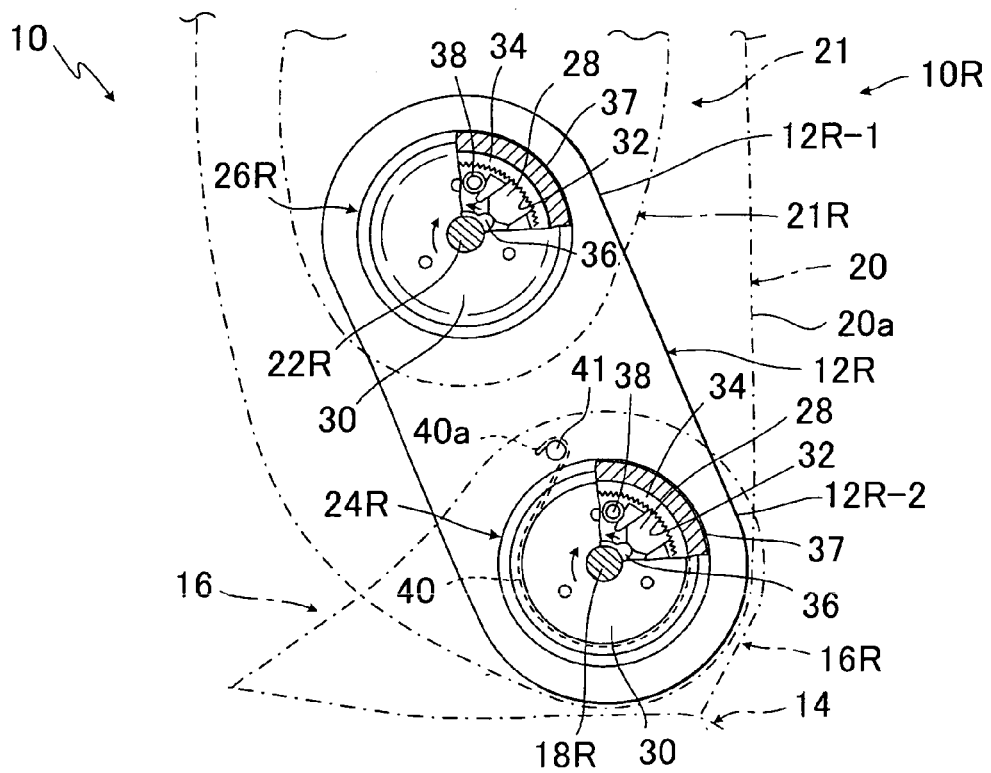
FIG. 7 is a diagram which particularly shows the reclining plate element and a pair of first and second lock mechanisms.

Specifically, as shown in FIG. 7, all the reclining and folding lock mechanisms (24R, 24L, 26R and 26R) are identical in structure to each other, and each of them basically comprises in common: a base housing (30) having a center at which the shaft (18R, 18L, 22R, or 22L) extends therethrough; a cam (36) fixed to that shaft; a rotatable circular frame (34) having an inwardly toothed lock gear portion (32) formed therein; a circular ring member (37) by which the rotatable circular frame (34) is rotatably connected with the base housing (30); and an outwardly toothed lock piece (28) movable for engagement with or disengagement from the inwardly toothed lock gear portion (32). The outwardly toothed lock piece (28) is slidable in the base housing (30) in diametric direction with respect to the foregoing shaft and normally contacted at the non-toothed end thereof with the cam (36) in order that the outwardly toothed end thereof is in a meshed engagement with the inwardly toothed lock gear portion (32). To insure this engagement, the cam (36) is normally biased by a spring (38) in a anticlockwise direction to a position where it is in contact with that non-toothed end of the outwardly toothed lock gear (28). Hence, as viewed from FIG. 7 for example, to rotate either of the upper and lower shafts (22R) (18R) clockwise, the cam (36) is caused to rotate in a likewise direction, overcoming the biasing force of the spring (38), and therefore brought out of contact with the outwardly toothed lock piece (28), with the result that the outwardly toothed lock piece (28) is disengaged from the inwardly toothed lock gear portion (32). Accordingly, with such unlocking operation, either the seat back frame (12) or the reclining plate element (12R or 12L) may be released from a locked state and rotated about its associated shaft (22R or 18R).

It is therefore to be seen that the bearing shaft itself (18R, 18L, 22R, or 22L) is not only a hinge point, but also an operative shaft for causing locking and unlocking operation of the above-described reclining and folding lock mechanisms (24R, 24L, 26R and 26L). But, the basic structure and functions of those reclining and folding lock mechanisms are known, for example, from a reclining device disclosed by the Japanese Laid-Open Patent Publication No. 2-228914, and thus, any further description thereon is omitted for the sake of simplicity.

Hereinafter, a specific description will be mainly made of the right-side reclining mechanical element (10R) for the sake of simplicity, and therefore it should be understood that the same description goes for the left-side reclining mechanical element (10L) as far as all the common or similar elements and parts between the right-side and left-side reclining mechanical elements (10R) (10L) are concerned.

Figure 3:
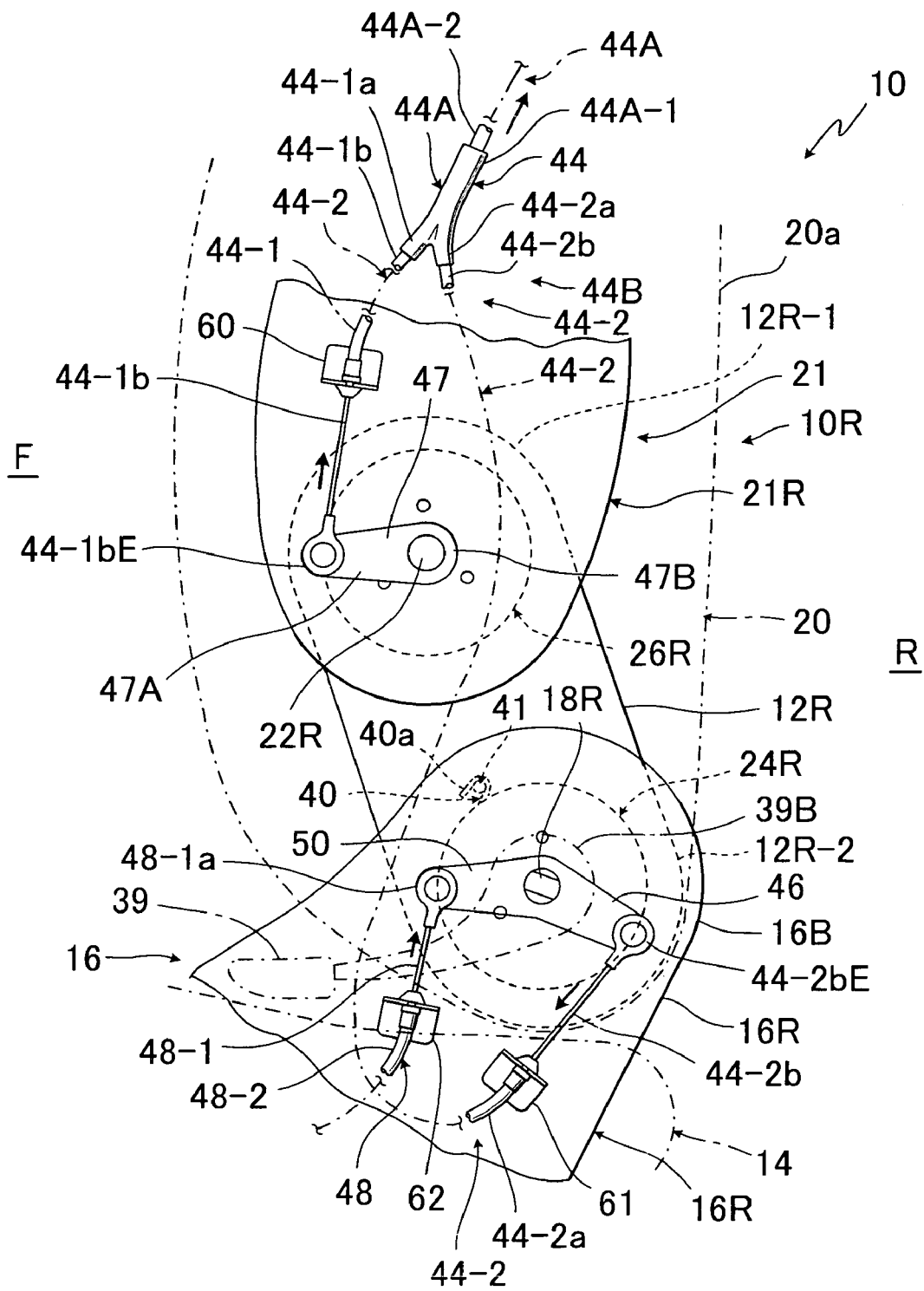
FIG. 3 is a partly broken enlarged view showing a principal part on one lateral side in the present invention.
Figure 4:
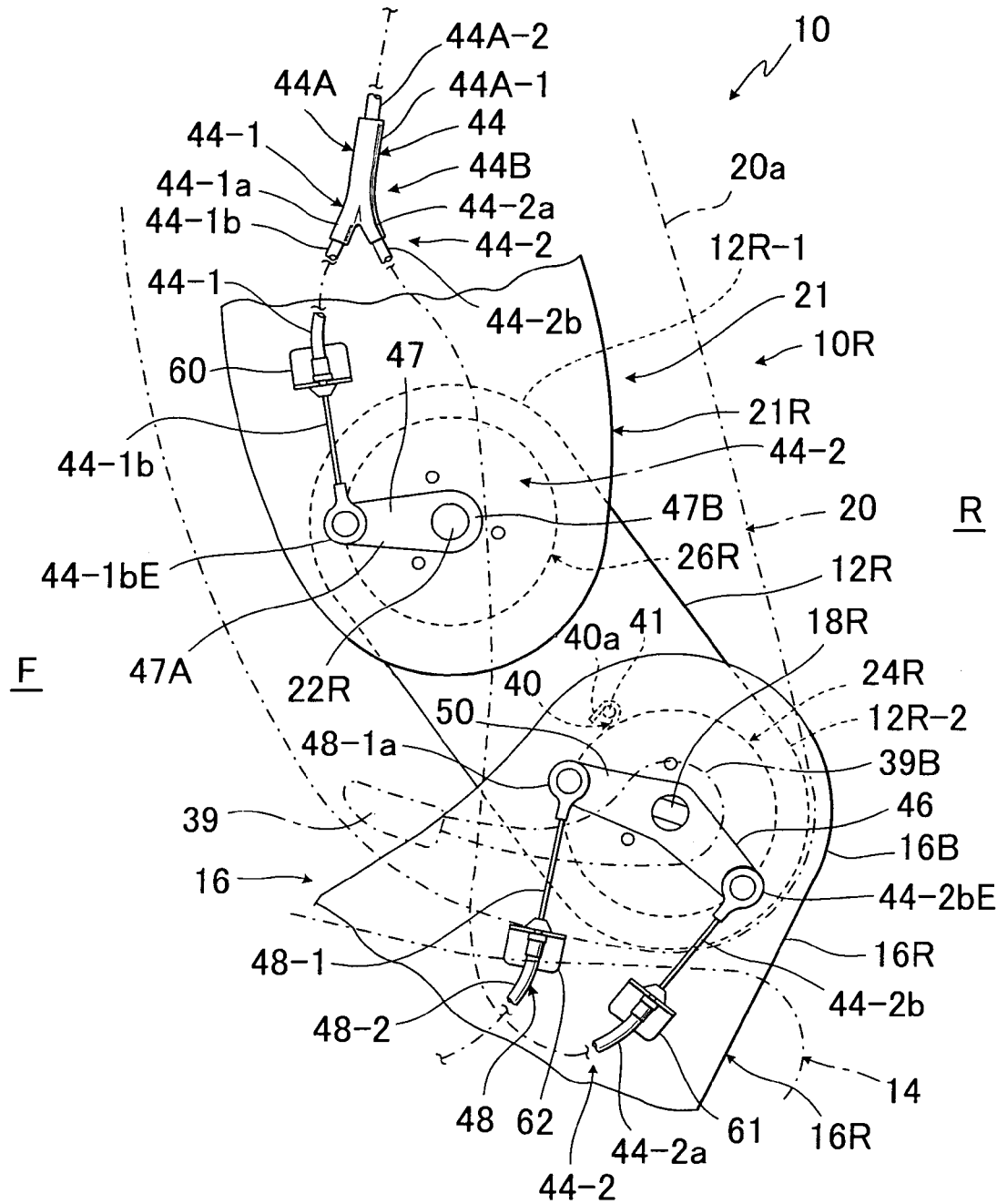
FIG. 4 is a partly broken enlarged view of the principal part shown in the FIG. 3, which shows the state where a reclining plate element is inclined to a forward inclination limit point.

Referring now to FIGS. 4 and 6, a reclining operation lever (39) is fixed to the outer end of the bearing shaft (18R) of the right-side reclining lock mechanism (24R). When this operation lever (39) is rotated upwardly or clockwise as indicated by the arrow in FIG. 3, overcoming the biasing force of the spring (38), the bearing shaft (18R) is simultaneously rotated clockwise, thereby causing displacement of the cam (36), which in turn causes disengagement of the outwardly toothed lock piece (28) from the inwardly toothed lock gear portion (34), so that the seat back (20) is released from the locked state and therefore can be inclined by a desired angle in forward and backward directions.

In this regard, if the folding lock mechanism (26R) is in a locked state, the seat back frame (21) or the seat back (20) is still locked to the reclining plate element (12R or 12L) and extends vertically and upwardly therefrom.

In the reclining device (10), there is provided a spiral spring (40) as a biasing means for biasingly causing the reclining plate element (12R) to rotate in the forward direction. For that purpose, as best seen in FIG. 6, the spiral spring (40) is fixed to the first bearing shaft (18R) and wound thereabout, with a free end (40a) thereof being secured to a pin (41) fixed on the reclining plate element (12R).

Hence, when the foregoing reclining lock mechanism (24R) is operated into unlocked state, as stated earlier, by the operation lever (39), the reclining plate element (12R) is caused by the spiral spring (40) to rotate in the forward direction relative to the lower hinge point or lower bearing shaft (18R), thereby automatically causing the seat back (20) to incline forwardly. With this forward inclination, it is possible for a user to adjust and set a desired reclining angle of the seat back (20) in the forward direction. On the other hand, under this unlocked state, the user may wish to forcibly incline the seat back (20) backwardly, overcoming the biasing force of the spiral spring (40), and adjust and set a desired reclining angle of the seat back (20) in the backward direction.

Figure 8:
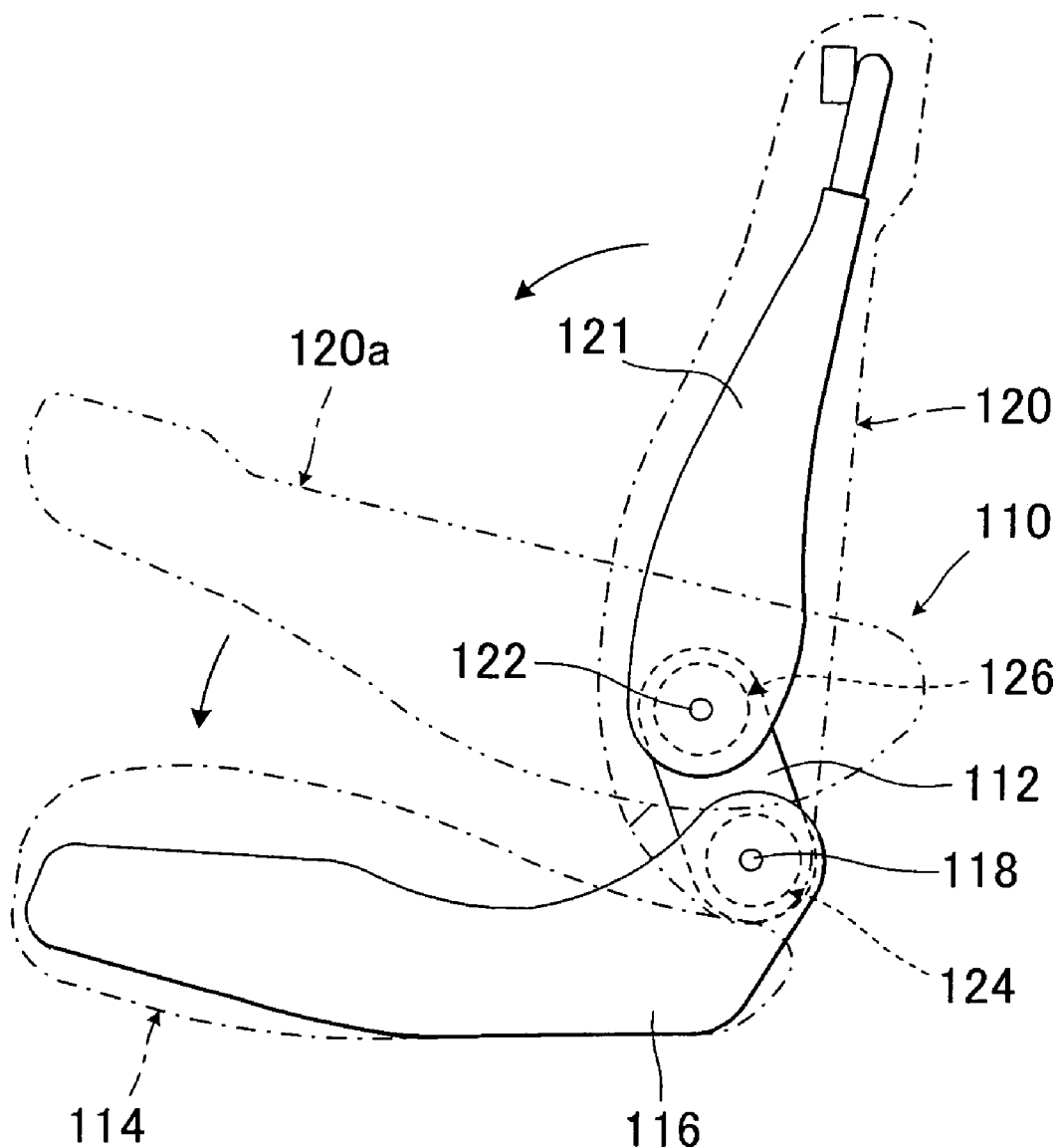
FIG. 8 is a schematic elevational side view showing a conventional reclining device of two-point hinged type.

Normally, as conventionally known in this particular fold-down type of seat (11), to unlock a lock mechanism equivalent to the folding lock mechanism (26R) will naturally allow the seat back (20) to be folded from a vertical use position down to a non-use position adjacent to the seat cushion (14), which is understandable from the FIG. 8 and the description of prior art above. As stated in the description of prior art, such folding down of seat back is limited by the lock mechanism or a stopper means (not shown), which is normally deemed to be a forward inclination limit point of the reclining plate element (at 112 in FIG. 8). This conventional forward inclination limit point, however, prevents the seat back (120) to be completely folded down, as a result of which, the backward side (120a) thereof is not set on a substantially horizontal line.

With the foregoing problem in view, the present invention contemplates on changing the forward inclination limit point of both two reclining plate elements (12R) (12L) with respect to the non-use position where the seat back (20) is folded down. That is, a forward inclination limit point of the reclining plate element (12R or 12L) is set to a point more forwardly than in the conventional reclining device, in order that the seat back (20) may be completely folded down onto the seat cushion (14), with the backward side (20*a*) thereof being positioned on a substantially horizontal line. This is understandable by making a comparative view between FIG. 2 and FIG. 8, form which it is seen that the reclining plate element (12R or 12L) of the present invention is inclined more forwardly than the reclining plate element (112) of the prior art to the degree that the seat back (20) can be completely folded down onto the seat cushion (14), with the backward side (20*a*) thereof extending on a substantially horizontal line. Otherwise stated, such forward inclination limit point is preset in order for the seat back (20) to be foldable forwardly relative to the upper hinge point (at 22R or 22L) in the reclining plate element (12R or 12L) which has been inclined to the forward inclination limit point, such that, after having inclined the seat back (20) to the forward inclination limit point relative to the lower hinge point (at 18R or 18L), the seat back (20) is foldable down to the seat cushion (14) relative to the upper hinge point (at 22R or 22L), with the backward side (20*a*) thereof extending along a substantially horizontal line, Further, in accordance with the present invention, as briefly understandable from FIG. 1, there is provided a flexible bifurcated wire cable of sheathed type, as generally designated by (44), between an unlocking lever (42) and the folding and reclining lock mechanisms (26R) (24R), so that a simple operation of such one unlocking lever (42) may be imparted via the flexible bifurcated wire cable (44) to both of the two lock mechanisms (26R) (24R) which will be in turn simultaneously operated in a synchronized manner into an unlocked state.

Specifically, the flexible bifurcated wire cable (44) is composed of: a single cable portion (44A) extending vertically in the seat back (20); and a bifurcated cable portion (44B) continuously extending from that single cable portion (44A) to seat cushion (14), the bifurcated cable portion (44B) being disposed at the upper and lower hinge points (at 22R and 18R) of the right-side reclining mechanical element (10R).

The single cable portion (44A) is formed by an flexible sheath member (or flexible tubular casing) (44A-1) and a wire (44A-2) of slidably extending in and along the flexible sheath member (44A-1). A free end (44*e*) of the wire (44A-2) of such single cable portion (44A) is fixed to the foregoing unlocking lever (42) which is provided in an upper region of the backward side (20*a*) of the seat back (20), as can be seen in FIG. 1. It is noted here that the unlocking lever (42) is known in the art and constructed such that one-touch operation thereof causes upward sliding movement of the wire (44A-2) through the sheath member (44A-1) in a direction to that particular unlocking lever (42). But, this is not the subjection matter of the present invention and no further detailed description thereon is omitted.

On the other hand, the bifurcated cable portion (44B) is formed by a first cable element (44-1) and a second cable element (44-2). The first cable element (44-1) is formed by: a flexible sheath member (or flexible tubular casing) (44-1*a*) continuous with the flexible sheath member (44A-1) of the single cable portion (44A); and a wire (44-1*b*) continuous with the wire (44A-2) of the single cable portion (44A), wherein the wire (44-1*b*) slidably extends in and along the flexible sheath member (44-1*a*). Likewise, the second cable element (44-2) is formed by: a flexible sheath member (or tubular casing) (44-2*a*) continuous with the flexible sheath member (44A-1); and a wire (44-2*b*) continuous with the wire (44A-2), the wire (44-1*b*) slidably extending in and along the flexible sheath member (44-1*a*).

As shown, a first connecting lever element (47) is firmly connected at a base end (47B) thereof with the bearing shaft (22R) of the folding lock mechanism (26R), whereas a second connecting lever element (46) is firmly connected with the bearing shaft (18R) of reclining lock mechanism (24R).

A free end portion of the first cable element (44-1) of the bifurcated cable portion (44B) is secured by a bracket (60) to the lateral frame member (21 R) of seat back frame (21) in the vicinity of the first connecting lever element (47). From that bracket (60), the wire (44-1*b*) of the first cable element (44-1) extends downwardly and terminates in an securing end potion (44-*b*E) fixed to the free end (47A) of the first connecting lever element (47).

On the other hand, the second cable element (44-2) of the bifurcated cable portion (44B) extends further donwardly from the first cable element (44-1) towards the lower hinge point (at 18R), and a free end portion of such second cable element (44-2) is secured by a bracket (61) to the backward end portion (16B) of seat cushion lateral frame member (16R) in the vicinity of the second connecting lever element (46). From that bracket (51), the wire (44-2*b*) of the second cable element (44-2) extends downwardly and terminates in an securing end potion (44-2*b*E) fixed to a free end of the second connecting lever element (46).

With the above-described wire cable arrangement, it is to be seen that operation of the unlocking lever (42) causes upward sliding movement of both two wires (44-1*b*) and (44-2*b*) in and through their respective tubular casings (44-1*a*) (44-2*a*), thereby causing clockwise rotation of both first and second connecting lever elements (47) (46) at the same time, whereupon both folding and reclining lock mechanisms (26R) (24R) are simultaneously placed in an unlocked state.

In this respect, more specifically stated, let us assume that, as shown in FIGS. 1 and 3, the seat back frame (21) or the seat back (20) is set in vertically extending use position and the reclining plate element (12R or 12L) is set at a certain position by a given inclination angle insofar as the seat back (20) is not inclined to the forward inclination limit point stated above. Under that condition, the first and second connecting lever elements (47) (46) are positioned at their respective locked points as seen in FIG. 3, so that both folding and reclining lock mechanisms (26R) (24R) are in a locked state, as understandable from FIG. 7. When the unlocking lever (42) is operated, all the wires (44A-2), (44-1*b*) and (44-2*b*) are simultaneously slidingly moved in and along their respective three tubular casings (44A-1), (44-1*a*) and (44-2*a*) in the upward direction as indicated by the three corresponding upward arrows in FIG. 3. Then, simultaneous therewith, both first and second connecting lever elements (47) (46) are rotated clockwise relative to their respective upper and lower hinge points (at 22R and 18R). This synchronized clockwise rotation of the first and second connecting lever elements (47) (46) results in simultaneous unlocking operation of both folding and reclining lock mechanisms (26R) (24R). In other words, with such synchronized clockwise rotation of the two connecting lever elements (47) (46), in each of the two lock mechanism (26R) (24R), the cam (36) is displaced, overcoming the biasing force of the spring (38), out of contact with the outwardly toothed lock piece (28), with the result that the outwardly toothed lock piece (28) is also displaced out of meshed engagement with the inwardly toothed gear lock portion (32). Thus, both folding and reclining lock mechanisms (26R) (24R) are placed in an unlocked state, thereby allowing the seat back frame (21) to be foldable about the upper hinge point (at 22R) forwardly from the vertical non-use portion, while also allowing the reclining plate element (12R) to be rotatable about the lower hinge (at 18R) forwardly from the current inclination point.

Figure 2:
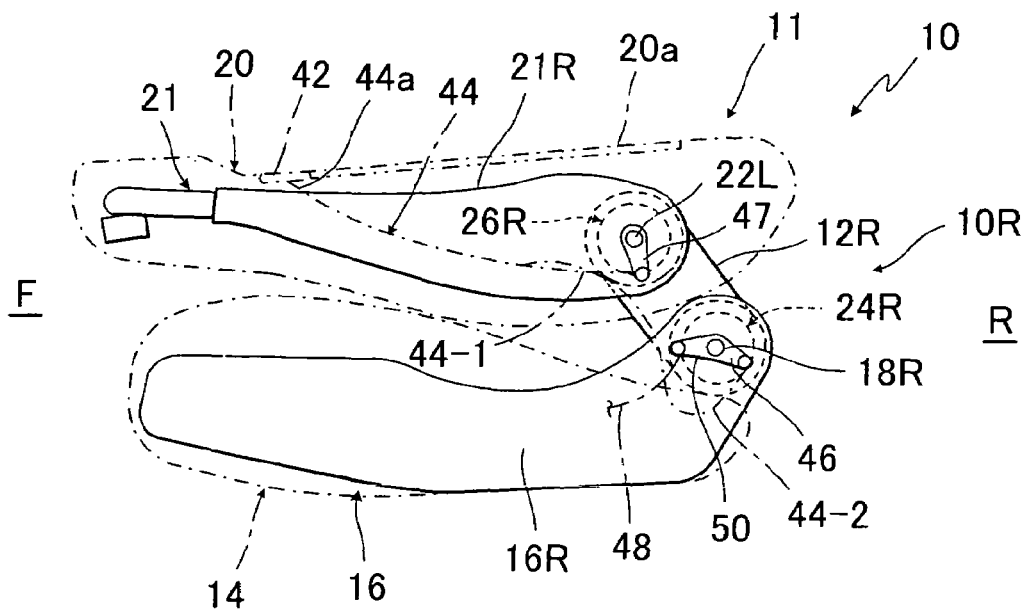
FIG. 2 is a schematic elevational side view of the reclining device, which shows the state where a seat back is folded to a non-use position.

At this moment, under the biasing force of the spiral spring (40), the reclining plate element (12R) is automatically rotated forwardly about the lower hinge point (at 18R) and stopped at the predetermined maximum forward inclination point by means of a stopper means (not shown), at which time, the seat back (20) is only inclined to that maximum forward inclination point, But, since such forward inclination limit point is so preset as to allow further forward rotation of the seat back (20) therefrom as stated earlier, the seat back (20) is further automatically folded forwardly, under its own gravity, onto the seat cushion (14), with the backward side (20a) thereof extending along a substantially horizontal line, as can be seen from FIGS. 1 and 2.

Accordingly, it is to be appreciated that simple operation of the unlocking lever (42) causes synchronized unlocking operation of both reclining and folding lock mechanisms (24R) (26R) via the flexible bifurcated wire cable (44), while allowing the reclining plate element (12R) and the seat back (20) to be automatically inclined relative to the lower hinge point (at 18R) toward the forward inclination limit point under the biasing force of the spiral spring (40), and that, immediately after having been inclined to that forward inclination limit point, the seat back (20) is further automatically folded forwardly relative to the upper hinge points (at 22R) to the non-use position where the backward side (20a) of the seat back (20) extends along a substantially horizontal line. This means that, in contrast to the prior art, there is no need for a user to check the inclination angle of the seat back (20) and pursue additional unlocking operation of the reclining lock mechanism (24R) to cause further forward folding of the seat back (20) relative to that inclination angle in order to insure that the backward side (20a) of the seat back (20) extends along a substantially horizontal line.

Further, only one flexible bifurcated wire cable (44) is simply connected between the unlocking lever (42) and the two bearing shafts (22R) (18R) respectively of the folding and reclining lock mechanisms (26R) (24R). Hence, the present invention provides an easy and simple operationability on the user's side.

Furthermore, such bifurcated wire cable (44), by the reason of its flexibility, can easily be accommodated and arranged, as desired, in any shape and kind of vehicle seat, thus not only simplifying the structure of seat, but also permitting for its versatile uses in the filed of seat.

Since the bifurcated flexible wire cable (44) is directly connected with all the pertinent elements, i.e. the unlocking lever (42) and the two lock mechanisms (26R) (24R), a drawing force given by operation of the unlocking lever (42), which pulls the wire (44A-2) upwardly, is transmitted immediately without any loss to both of the two connecting lever elements (47) (46) via the two bifurcated wire cable portions (44-1) (44-2). This insures synchronized unlocking operation of both folding and reclining lock mechanisms (26) (24).

According to the illustrated embodiment, as best seen in FIG. 6, a pair of two-point hinged reclining mechanical elements may be provided to constitute a dual reclining structure in the fold-down seat (11). Namely, in addition to the above-described right-side two-point hinged reclining mechanical element (10R), there may be provided another left-side two-point hinged reclining mechanical element (10L).

Figure 5:
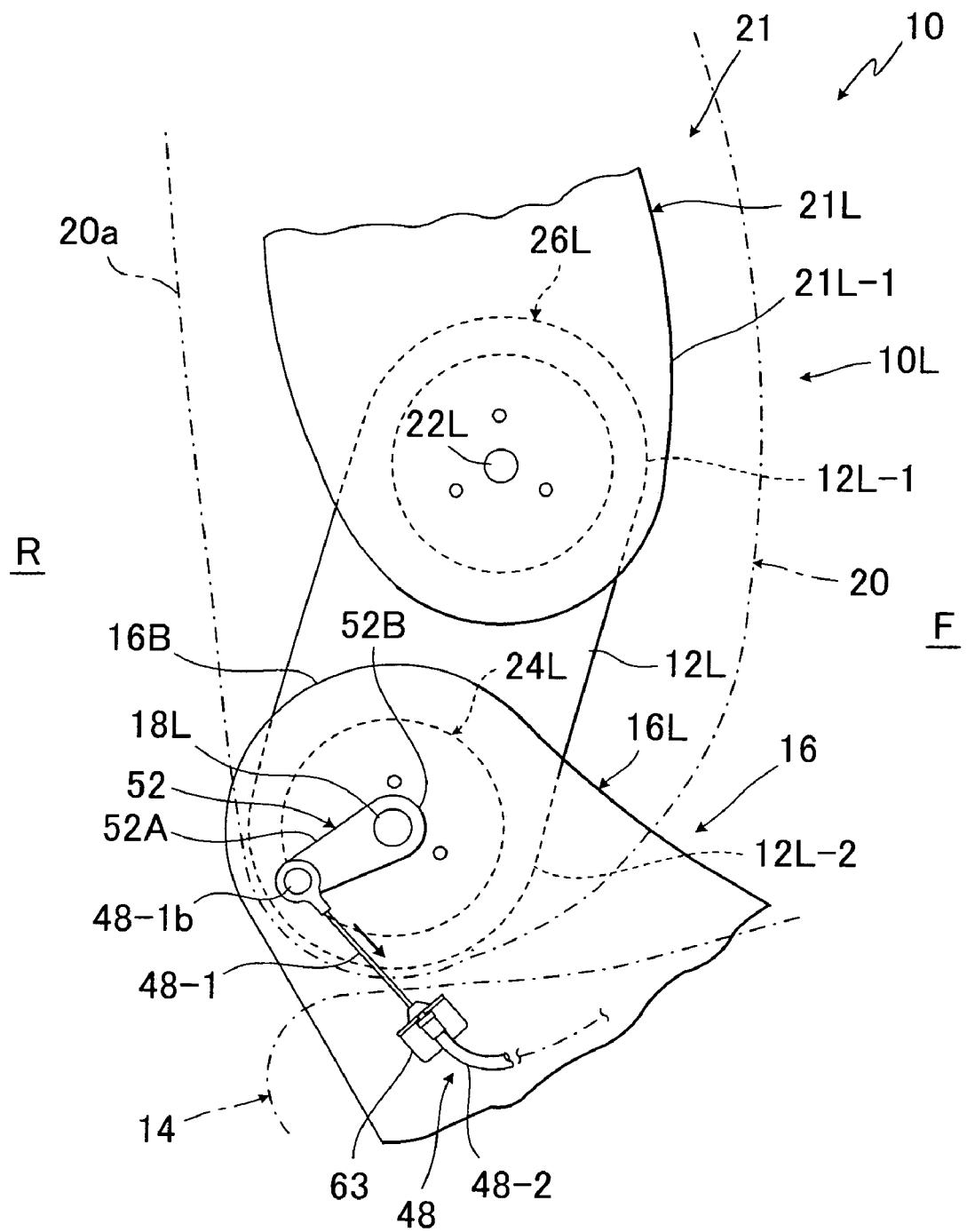
FIG. 5 is a partly broken enlarged view showing another principal part on another lateral side in the present invention.

In such dual reclining structure, in accordance with the present invention, it is easily possible to provide a simplified connecting arrangement between such two reclining mechanical elements (10R) (10L) in order to insure synchronized unlocking operation of those two particular reclining mechanical elements (10R) (10L). Reference is now made to FIG. 5 in conjunction with FIGS. 3 and 6. The left-side two-point hinged reclining mechanical element (10L) is identical to the above-described right-side two point hinged reclining mechanical element (10R) only in terms of the folding lock mechanism (26L) and the reclining lock mechanism (24L). Hence, in both of the left-side and right-side reclining mechanical elements (10L) (10R), the folding and reclining lock mechanisms (26L) (24L) used are of the same mechanical structure as described previously and no further description is given thereon.

As viewed from FIG. 6, in the left-side reclining mechanical element (10L), the folding lock mechanism (26L) has a bearing shaft (22L) which is disposed on the left as a left-side upper hinge point and extends horizontally in a coaxially aligned relation with the right-side bearing shaft (22R) of the right-side folding lock mechanism (26R), whereas on the other hand, the relining lock mechanism (24L) has a bearing shaft (18L) which is disposed on the left as a left-side lower hinge point and extends horizontally in a coaxially aligned relation with the right-side bearing shaft (18R) of the right-side reclining lock mechanism (24R).

In contrast to the right-side two-point hinged reclining mechanical element (10R), only one connecting lever element (52) is fixed to the bearing shaft (18L) of the left-side reclining lock mechanism (24L). Hereinafter, such connecting lever element (52) shall be referred to as "fourth connecting leer element (52)" in view of a third connecting lever element (50) to be described below.

Accordingly, in the present embodiment, as shown in FIG. 6, a connecting rod (49) may be fixedly connected between the left-side upper hinge point (at 22L) and the right-side upper hinge point (at 22R) in order to cause synchronized operation of both left-side and right-side folding lock mechanisms (26L) and (26R). Specifically, the connecting rod (49) may be integrally connected at one end thereof with the inwardly facing end of the left-side bearing shaft (22L) and also integrally connected at another end thereof with the inwardly facing end of the right-side bearing shaft (22R).

Further, as shown in FIGS. 3 and 5, another second flexible wire cable (48) may be operatively connected between the left-side lower hinge point (at 18L) and the right-side lower hinge point (at 18R) in order to cause synchronized operation of both left-side and right-side reclining lock mechanisms (24L) and (24R). In this respect, specifically, as shown in FIG. 3, an additional third connecting lever element (50) may be integrally fixed to the right-side bearing shaft (18R) in a generally diametrically opposed relation with the second connecting lever element (46). In other words, as illustrated, those third and second connecting lever elements (50) and (46) may be formed integrally together so as to be disposed substantially on the opposite sides of the bearing shaft (18R), with a common center of rotation thereof being at a central axis of that bearing shaft (18R).

The afore-said second flexible wire cable (48) is a single wire cable as opposed to the previously stated bifurcated flexible wire cable (44) and formed by a sheath member (or tubular casing) (48-2) and a wire (48-1) slidably extending in and along the sheath member (48-2).

As shown in FIG. 3 by way of example, one end portion of the second flexible wire cable (48) is secured by a bracket (62) to the backward end portion (16B) of right-side seat cushion lateral frame member (16R) in the vicinity of the third connecting lever element (50). From that bracket (62), the wire (48-1) of the second flexible wire cable (48) extends upwardly and terminates in an end (48-1a) fixed to a free end of the third connecting lever element (50).

As understandable from FIGS. 3 and 5 in conjunction with FIG. 6, the second flexible wire cable (48) extends from the right-side seat cushion lateral frame member (16R) in a direction transversely of the seat (11) towards the left-side seat cushion lateral frame member (16L). Thus, as seen in FIG. 5, another end of the second flexible wire cable (48) is secured by a bracket (63) to the backward end portion (16B) of the left-side seat cushion lateral frame member (16L) in the vicinity of the fourth connecting lever element (52). From that bracket (63), the wire (48-1) of the second flexible cable wire (48) extends upwardly and terminates in a securing end potion (48-1b) fixed to the free end (52A) of the third connecting lever element (52). The base end portion (52B) of that third connecting lever element (52) is fixed to the left-side second bearing shaft (18L) associated with the left-side reclining lock mechanism (24L).

With such wire cable arrangement in dual reclining structure, when the unlocking lever (42) is operated, both two wires (44-1b) (44-2b) are moved slidingly in and through their respective tubular casings (44-1a) (44-2a), which causes simultaneous clockwise rotation of all the first, second and third connecting lever elements (47), (46) and (50), thereby causing simultaneous clockwise rotation of both right-side first and second bearing shafts (22R) (22L). At this very moment, it is seen that both right-side and left-side first bearing shafts (22R) (22L) are simultaneously rotated clockwise via the connecting rod (49) which connects them integrally, while at the same time, the ongoing clockwise rotation of the third connecting lever element (50) on the right side is directly transmitted via the single wire cable (48) to the fourth connecting lever element (52) on the left side, thereby causing clockwise rotation of the left-side second bearing shaft (18L). In this regard, it is added that the clockwise rotation of third connecting lever element (50) causes the wire (48-1) to slidingly move through the sheath member (48-2), as indicated by the arrows in FIGS. 4 and 5, thereby causing simultaneous clockwise rotation of the fourth connecting lever element (52).

Through the foregoing synchronized transmission via the wire cables (44 and 48) and connecting rod (49), all the bearing shafts (22R, 22L, 18R and 18L) are simultaneously rotated clockwise to cause disengagement of the outwardly toothed lock piece (28) from the inwardly toothed lock gear portion (32) in each of the associated lock mechanisms (26R, 26L, 24R and 24L) as previously described, whereupon all of the folding and reclining lock mechanisms on both right and left sides (26R, 26L, 24R and 24L) are unlocked at the same time. It is therefore appreciated that combination of the flexible bifurcated wire cable (44), single wire cable (48) and connecting rod (49) in effect insures direct transmission of unlocking operation of the unlocking lever (42) to all the four lock mechanisms (26R, 26L, 24R and 24L), without any reduction or loss of transmission of the unlocking operation on the way thereto. This in turn insures complete synchronized unlocking operation of those four lock mechanisms.

Of course, instead of the flexible wire cable (48), a connecting rod similar to the foregoing connecting rod (49) may be connected between the right-side and left-side lower baring shafts (18R) (18L). But, in that case, such connecting rod contacts a buttock portion of occupant sitting on the seat (11) and gives an unpleasant hard touch to him or her. Hence, the flexible wire cable (48) is preferred because it may be freely bendable and disposed at a lowest possible point in the seat cushion (14), so that the seat occupant dose not feel any objectionable touch at his or her buttock portion.

Also, instead of the flexible bifurcated wire cable (44), two separate flexible wire cables may be employed. In that case, two end portions respectively of such two flexible wire cables may be connected with the first and second connecting lever elements (47) (46), respectively, whereas one end of each of them be connected with the unlocking lever (42). But, use of the bifurcated flexible wire cable (44) is recommended in terms of low cost and simplicity, because it can be easily connected between those elements (42, 47 and 46) without requiring any other separate parts involved.

While having described the present invention thus far, it should be understood that the invention is not limited to the illustrated embodiment, but any modification, replacement and addition may be applied thereto without departing from the scopes of the appended claims.

What is claimed is:

1. A reclining device of two-point hinged type in combination with a seat having a seat cushion and a seat back, which has: a lower hinge point about which said seat back is inclinable in a direction forwardly and backwardly of said seat, said lower hinge point being defined at a seat cushion frame provided in said seat cushion; and an upper hinge point about which said seat back is foldable forwardly of the seat in a direction from a use position where the seat back extends vertically from the seat cushion down to a non-use position where the seat back is positioned adjacent to said seat cushion, wherein said upper hinge point is defined above said lower hinge point, and wherein said seat back has a backward side which faces to a side backwardly of said seat when the seat back is set at said use position, said reclining device of two-point hinge type comprising:

a reclining plate element having one end disposed at said lower hinge point and another end disposed at said upper hinge point, said reclining plate element being rotatable relative to said lower hinge point in the direction forwardly and backwardly of said seat, wherein a forward inclination limit point is defined to limit rotation of the reclining plate element in the direction forwardly of the seat relative to said seat cushion, a biasing means for biasingly causing said reclining plate element to rotate relative to said lower hinge point in a direction forwardly of said seat;

a first lock mechanism for locking and unlocking said reclining plate element, said first lock mechanism being fixedly provided to said seat cushion frame and having a shaft disposed at a point corresponding to said lower hinge point, wherein said shaft is connected with said one end of said reclining plate element, with such an arrangement that rotation of said shaft in one direction causes unlocking operation of said first lock mechanism to unlock said reclining plate element, thereby allowing inclination of said seat back relative to said lower hinge point in a direction forwardly and backwardly of said seat, whereas by contrast, rotation of said shaft in another direction opposite to said one direction causes locking operation of said first lock mechanism so as to lock said reclining plate element against said inclination;

a second lock mechanism for locking and unlocking said seat back, said second lock mechanism having a shaft disposed at a point corresponding to said upper hinge point, wherein said shaft is connected with said another end of said reclining plate element, with such an arrangement that rotation of said shaft in one direction causes unlocking operation of said second lock mechanism to unlock said seat back with respect to said reclining plate element, thereby allowing for folding of said seat back relative to said upper hinge point in a direction forwardly and backwardly of said seat, whereas by contrast, rotation of said shaft in another direction opposite to said one direction causes locking operation of said second lock mechanism so as to lock said seat back against said folding relative to the upper hinge point;

one unlocking lever operatively provided in a predetermined position;

a flexible wire cable means comprising a flexible sheath means and a wire means slidably extending in and along said flexible sheath member, wherein said shaft of said first lock mechanism and said shaft of said second lock mechanism are operatively connected with said one unlocking lever via said wire means of said flexible wire cable means, wherein said forward inclination limit point is preset in order for said seat back to be foldable forwardly of the seat, relative to said upper hinge point in said reclining plate element which has been inclined to the forward inclination limit point, such that, after having inclined the seat back to said forward inclination limit point relative to said lower hinge point, the seat back is foldable down to the seat cushion relative to said upper hinge point, with the backward side thereof extending along a substantially horizontal line, and wherein, upon operation of said one unlocking lever, said wire means is slindingly moved through said flexible sheath means, thereby directly causing both said shafts respectively of said first and second lock mechanisms to rotate simultaneously in said one direction and thus causing said unlocking operation of both said first and second lock mechanisms in synchronized manner, so that said reclining plate element is automatically inclined by said biasing means relative to said lower hinge point to said maximum forward inclination point, after which, said seat back is foldable relative to said upper hinge point in the thus-inclined reclining plate element down to a predetermined non-use position where the backward side of the seat back extends along the substantially horizontal line.

2. The reclining device of two-point hinged type as claimed in claim 1, wherein said flexible wire cable means comprises a flexible bifurcated wire cable which essentially consists of: a single flexible wire cable portion; and a bifurcated flexible wire cable portion extending continuous with said single flexible wire cable portion, said bifurcated flexible wire cable portion having a first flexible wire cable portion and a second flexible wire cable portion, wherein said single flexible wire cable portion extends toward said unlocking lever, wherein said first flexible wire cable portion extends toward said shaft of said first lock mechanism, while said second flexible wire cable portion extends toward said shaft of said second lock mechanism, wherein said single flexible wire cable portion is formed by: a flexible sheath member forming a constituent part of said flexible sheath means; and a wire forming a constituent part of said wire means, said wire being sliidingly movable in and through said flexible sheath member and connected with said unlocking lever, wherein said first wire cable portion of said bifurcated wire cable portion is formed by: a flexible sheath member forming one constituent part of said flexible sheath means; and a wire forming one constituent part of said wire means, said wire being slidingly movable in and through said flexible sheath member and connected with said shaft of said first lock mechanism, and wherein said second wire cable portion of said bifurcated wire cable portion is formed by: a flexible sheath member forming one constituent part of said flexible sheath means; and a wire forming one constituent part of said wire means, said wire being slidingly movable in and through said flexible sheath member and connected with said shaft of said second lock mechanism.

3. The reclining device of two-point hinged type as claimed in claim 2, which further comprises: a first connecting lever element fixed to said shaft of said first lock mechanism; and a second connecting lever element fixed to said shaft of said second lock mechanism, wherein said wire of said single flexible wire cable portion is connected with said unlocking lever, wherein said wire of said first wire cable portion is connected with said first connecting lever element, and wherein said wire of said second wire cable portion is connected with said second connecting lever element.

4. The reclining device of two-point hinged type as claimed in claim 1, which further comprises: a first connecting lever element fixed to said shaft of said first lock mechanism; and a second connecting lever element fixed to said shaft of said second lock mechanism, and wherein one end of said wire means of said flexible wire cable means is connected with said unlocking lever, while another end of said wire means is connected with said first and second lever elements.

5. The reclining device of two-point hinged type as claimed in claim 1, which is of a dual reclining structure comprising: one set of said upper and lower hinge points defined at one lateral side thereof; another set of said upper and lower hinge points defined at another lateral side thereof; a pair of said reclining plate elements; a pair of said first lock mechanisms; and a pair of said second lock mechanisms, wherein one of said pair of said reclining plate elements is disposed at said one set of said upper and lower hinge points and connected herewith in the same manner as described in the claim 1, whereas another of said pair of said reclining plate elements is disposed at said another set of said upper and lower hinge points and connected therewith in the same manner as described in the claim 1, wherein one of said pair of said first lock mechanisms is provided to said one lateral side, such that the shaft thereof is disposed at a point corresponding to the lower hinge point in said one set of said upper and lower hinge points, whereas another of said pair of said first lock mechanisms is provided to said another lateral side, such that the shaft thereof is disposed at a point corresponding to the lower hinge point in said another set of said upper and lower hinge points, wherein one of said pair of said second lock mechanisms is provided to said one lateral side, such that the shaft thereof is disposed at a point corresponding to the upper hinge point in said one set of said upper and lower hinge points, whereas another of said pair of said second lock mechanisms is provided to said another lateral side, such that the shaft thereof is disposed at a point corresponding to the upper hinge point in said another set of said upper and lower hinge points, wherein said shaft of said one of said pair of said first lock mechanisms and said shaft of said one of said pair of said second lock mechanisms are operatively connected with said one unlocking lever via said wire means of said flexible wire cable means, wherein a connecting means is fixedly connected between said shaft of said another of said pair of said first lock mechanisms and said shaft of said another of said pair of said second lock mechanism, wherein another flexible wire cable means is provided, which comprises a flexible sheath means and a wire means slidably extending in and along said flexible sheath member, and wherein one end of said wire means of said another flexible wire cable means is connected with said shaft of said one of said first lock mechanism, whereas another end of said wire means of said another flexible wire cable means is connected with said shaft of said another of said first lock mechanism.

* * * * *